(12) United States Patent
Ramakrishnan et al.

(10) Patent No.: US 6,960,645 B2
(45) Date of Patent: Nov. 1, 2005

(54) SYNTHESIS OF ION IMPRINTED POLYMER PARTICLES

(75) Inventors: Kala Ramakrishnan, Thiruvananthapuram (IN); Mary G. Joseph, Thiruvananthapuram (IN); Talasila P. Rao, Thiruvananthapuram (IN)

(73) Assignee: Council of Scientific and Industrial Research, New Delhi (IN)

( * ) Notice: Subject to any disclaimer, the term of this patent is extended or adjusted under 35 U.S.C. 154(b) by 33 days.

(21) Appl. No.: 10/811,294

(22) Filed: Mar. 26, 2004

(65) Prior Publication Data

US 2005/0215762 A1 Sep. 29, 2005

(51) Int. Cl.$^7$ ............................................. C08F 6/00
(52) U.S. Cl. ................ 528/480; 422/82.07; 422/82.08; 435/7.1; 436/172; 436/174
(58) Field of Search ......................... 422/82.07, 82.08; 435/7.1; 436/172, 174; 528/480

(56) References Cited

U.S. PATENT DOCUMENTS

2003/0129092 A1 * 7/2003 Murray .................... 422/82.07

FOREIGN PATENT DOCUMENTS

WO    WO-03/034043 A2    4/2003

OTHER PUBLICATIONS

Regis Garcia et al., "Ionic Imprinting effect in fadolinium/lanthanum separation", Tetrahedron Letters, vol. 39, No. 47 Jan. 25, 1999, pp. 8651-8654.

Sobhi Daniel, et al., "Synthesis of imprinted polymer material with palladium ion nanopores and its analytical application", Analytica Chimica Acta, Col. 488, No. 2, Jul. 5, 2003, pp. 173-182.

* cited by examiner

Primary Examiner—Terressa Boykin
(74) Attorney, Agent, or Firm—Darby & Darby

(57) ABSTRACT

Ion imprinted polymer materials are synthesized containing metal ion recognition sites. These particles are synthesized by copolymerizing with functional and cross linking monomers in presence of at least one imprint metal ion in the form of ternary complex. The polymerization was carried out by □-irradiation (in the absence of initiator) or photochemical and thermal polymerization (in presence of initiator, AIBN). These materials were ground and sieved after drying to obtain erbium ion imprinted polymer particles. The erbium ion was removed from the polymer particles by leaching with mineral acid which leaves cavities/binding sites in the polymer particles. The resultant polymer particles can be used as solid phase extractants for selective enrichment of erbium ions from dilute aqueous solutions.

10 Claims, 4 Drawing Sheets

SYNTHESIS OF ION IMPRINTED POLYMER PARTICLES

FIELD OF THE INVENTION

The present invention relates to the synthesis of ion imprinted polymer particles for solid phase extractive preconcentration of erbium ions and to a process thereof. Ion imprinted polymer particles have been prepared by radiochemical, photochemical and thermal polymerization.

BACKGROUND OF THE INVENTION

Monazite sand is processed by a series of beneficiation processes to produce lighter, middle and heavier rare earth chloride fractions. The last fraction contains 55–60% $Y_2O_3$ along with Dy, Gd and Er as impurities. The preparation of 99.9–99.999% $Y_2O_3$ gains importance as it is widely used in manufacture of lasers, superconducting materials and colour T.V. Phosphors. Hence, the separation of Dy, Gd and Er is an essential prerequisite to prepare such high purity $Y_2O_3$. The three different polymerization processes described in this patent enables the separation of erbium from $Y_2O_3$.

Enantiomer Separation

Reference is made to Mark et al., WO 98/07671; 1998, who have prepared imprinted polymers for the separation of optically active compounds of ibuprofen, naproxen and ketoprofen into their respective enantiomers. Reference is made to Mosbach et al., U.S. Pat. No. 6,316,235; 2001 who have prepared magnetically susceptible components by copolymerizing one or more functional monomers and crosslinking monomer in presence of at least one imprint molecule and at least one magnetically susceptible component such as iron oxide or nickel oxide. The imprint molecule was subsequently removed to form molecular memory recognition sites. These particles are used for selective separation of two different enantiomeric forms. Reference is also made to Arnold et al., U.S. Pat. No. 5,786,427; 1998, who prepared solid phase extractant materials which include polymeric matrix containing one or more metallic complexes by molecular imprinting, which selectively binds only one enantiomer of the optically active amino acid or peptide. Reference is made to Fischer et al, U.S. Pat. No. 5,461,175; 1995 who synthesized chiral chromatographic materials for separating enantiomers of a derivative of an aryloxipropanol amine.

Sensors

Reference is made to Arnold et al., U.S. Pat. No. 6,063,637; 2000 who have developed sensors composed of a metal complex that binds the target molecule and releases a proton or includes an exchangeable ligand which is exchanged for the target molecule during the binding interaction between the metal complex and target molecule. These sensors are meant for detecting the presence of sugars and other metal binding analytes. Reference is made to Yan et al., U.S. Pat. No. 5,587,273; 1996 who prepared molecular imprinted substrate and sensors by first forming a solution comprising a solvent and (a) polymeric material capable of undergoing an addition reaction with nitrene, (b) a cross-linking agent, (c) a functional monomer and (d) an imprinting molecule.

Other Applications of Molecular Imprinting

Reference is made to Markowitz et al, U.S. Pat. No. 6,310,110; 2001 who synthesized molecular imprinted porous structures by self assembling surfactant analogue to create at least one supramolecular structure having exposed imprint groups. The imprinted porous structure is formed by adding reactive monomers to the mixture and allowing the monomers to polymerize with the supramolecular structure serving as the template. Reference is also made to Sasaki et al., U.S. Pat. No. 6,057,377; 2000 who have developed a method for molecular imprinting on the surface of a sol-gel material, solvent, an imprinting molecule to form the molecular imprinted metal oxide sol-gel materials. Reference is made to Mosbach and Olof, U.S. Pat. No. 6,255,461; 2003 who prepared artificial antibodies by molecular imprinting, wherein methacrylic acid, ethylene glycoldimethacrylate and a corticosteroid print molecule are combined to form artificial antibody. These antibodies can be used in separation and analytical procedures. Reference is also made to Magnus et al., U.S. Patent application 2003-049970; 2003 who have prepared selective adsorption material which can be used for purification or analysis of biological macromolecules.

Ion Imprinting—Anions

Reference is made to Murray, U.S. Patent Application 2003-113234; 2003 who has prepared molecularly imprinted polymer membranes for selectively collecting phosphate, nitrate and ferric ions. These membranes are prepared by copolymerizing a matrix monomer, cross linking monomer, ion imprinting complex, permeability agent and polymerization initiator, after which the ions of the ion imprinting complex and permeability agent are removed. The permeability agent creates channels in the membrane permitting membrane to communicate with the exterior surface of the the ion binding sites in the membrane. Murray, U.S. Patent Application 2003-059346; 2003 addresses the removal of phosphate/nitrate anions using selectively permeable polymer membrane. The selective binding site is prepared by ferric ion imprinting. Permeability is improved by using a polyester that associates with metal ions; the polyester is removed from the membrane by the same acid treatment used to remove ferric ion. The polyester creates channels directing the ion migration to the imprinted sites, thus, increasing the flux but maintaining selectivity.

Ion Imprinting—Cations

Reference is made to Singh et al, U.S. Pat. No. 6,248,842; 2001 who produced selective, crosslinked chelating polymers by substituting an acyclic chelating agent with a polymerizable functional group. The resulting substituted acyclic chelating agent is then complexed with the target metal ion, i.e. copper. A crosslinkable monomer is then added and the complexed material is crosslinked. The complexed metal is then removed, providing a crosslinked polymeric chelating agent that has been templated for the target metal ion. Reference is made to John et al, WO 99/15707; 1999 relating to the detection and extraction of uranyl ion by polymer imprinting wherein the complexable functionality is of the formula CTCOOH, where T is a hydrogen or any halogen (preferably chlorine), methyl and halogen substituted form thereof or COOH or PhCOOH. Gladis and Rao also teach synthesis of ion imprinted polymers for solid phase extractive preconcentration/separation of uranyl ion from host of tetravalent, tervalent and bivalent inorganic ions from both aqueous and synthetic sea water solutions. They form ternary mixed ligand complex of imprint ion with quinoline-8-ol or its dihalo derivatives and 4-vinyl pyridine in presence of styrene and divinyl benzene as functional and crosslinking monomers. Reference is made to Dai et al, U.S. Pat. No. 6,251,280; 2001 who prepared mesophorous sorbent materials by ion imprinting technique for the separation of inorganics using bifunctional ligands such as amines, thiols, carboxylic acids, sulphonic acids and phosphonic acids. Carboxylic acid groups on bifunctional ligands are used during the formation of mesophoric sorbent materials specific for erbium template ion.

Rao et al [Trends in Anal. Chem.; 2003] have reviewed the preparation of tailored materials for preconcentration/separation of metals by ion imprinted polymers for solid phase extraction (IIP-SPE). Ion imprinted polymer (IIP) materials with nanopores were prepared by formation of ternary complex of palladium imprint ion with dimethyl glyoxime and 4-vinyl pyridine and thermally copolymerizing with styrene and divinyl benzene in presence of 2,2'-azobisisobutyronitrile using cyclohexanol as porogen [Sobhi et al, Anal. Chim. Acta, 488 (2003) 173–182]. Cation imprinted SPE materials for separation of La and Gd based on diethylenetriaminepentaacetic acid (DTPA) derivatives have been prepared. Imprinting effect was observed with materials prepared in the presence of Gd salts and exhibited high efficiency and selectivity than the corresponding blank polymers [Garcia et al, Tetrahedran Lett., 39 (1998) 8651]. The functionalized monomer of DTPA was copolymerized with commercially available divinyl benzene (DVB) containing 45% ethyl styrene in presence of $Gd^{3+}$ salt. The resulting IIP was found to be more selective for Gd compared to La [Vigneau et al, Anal. Chim. Acta, 435 (2001) 75]. These selective studies were extended to determine $S_{Gd/Eu}$ and $S_{Gs/Lu}$ using Gd imprinted IIP [Logneau et al, Chem. Lett. (2002) 202]. Biju et al [Anal. Chim. Acta, 478 (2003) 43–51] have synthesized Dy (III) IIP particles by copolymerizing styrene (functional monomer) in presence of DVB as crosslinking monomer. Some authors [Talanta, 60 (2003) 747–754] have reported improved selectivity coefficients for Dy over La, Nd, Y and Lu on post γ-irradiation of Dy IIP particles.

Molecular imprinted polymer particles prepared are widely used in separation of enantiomers, structurally related drugs, amino acid derivatives, nucleotide base derivatives etc. Thus, they find widespread use in chemical and pharmaceutical industries, water purification and waste treatment. On the other hand, the preparation of ion imprinted polymer particles are not that popular for the separation of closely related inorganic ions. The patent by Dai et al [U.S. Pat. No. 6,251,280; 2001] alone addresses this problem but is too general and do not involve separation of Er from closely related lanthanides.

OBJECTS OF THE INVENTION

The main object of the present investigation is to prepare Erbium IIP materials by γ-irradiation in presence of varying amounts of methyl methacrylate (MMA) (functional monomer).

It is another object of the invention to provide a process for the preparation of Erbium IIP materials by photochemical polymerization as a function of time of exposure.

It is another object of the invention to provide a process for the preparation of Erbium IIP materials by thermal polymerization as a function of EGDMA concentration (crosslinking monomer).

Yet another object of the present invention is to preconcentratively separate Erbium from other selected lanthanides using IIP particles through solid phase extraction.

SUMMARY OF THE INVENTION

Accordingly the present invention provides a process for the synthesis of ion imprinted polymer particles for solid phase extraction preconcentration of erbium ions which comprises:
(a) forming a mixed ligand ternary complex of erbium imprint ion with 5,7-dichloroquinoline-8-ol and 4-vinyl pyridine;
(b) dissolving the ternary complex in a suitable porogen to form a pre-polymerizing mixture;
(c) combining the mixture of step (b) with a functional monomer and a crosslinking monomer and polymerizing by γ-irradiation or by photochemical and thermal polymerization to obtain a polymer material;
(d) grinding and sieving of polymer material obtained in (c) to prepare erbium ion imprinted polymer particles;
(e) selective leaching of imprint ion embedded materials in the polymer particles of (d) using a mineral acid.

In one embodiment of the invention, the γ-irradiation is carried out as a function of methyl methacrylate (functional monomer) concentration.

In another embodiment of the invention, the photochemical polymerization is carried out as a function of time of UV irradiation.

In another embodiment of the invention, the thermal polymerization is carried out as a function of ethyleneglycoldimethacrylate (crosslinking monomer) concentration.

In another embodiment of the invention, the functional monomer is selected from the group consisting of 4-vinylpyridine and methylmethacrylate.

In another embodiment of the invention, the crosslinking monomer comprises ethylene glycol dimethacrylate.

In another embodiment of the invention, the reaction is carried out using 2,2'-azobisisobutyronitrile is used as initiator in step (c).

In yet another embodiment of the invention, the grinding and sieving in step (d) is carried out after drying of the erbium ion imprinted polymer materials.

In another embodiment of the invention, the mineral acid used for leaching comprises HCl.

BRIEF DESCRIPTION OF THE ACCOMPANYING DRAWINGS

In the drawings accompanying this specification,

FIG. 1. Represents the UV-visible absorption spectra of 5,7-dichloroquinoline-8-ol (DCQ), 4-vinyl pyridine (VP), DCQ+VP, $Er^{3+}$+DCQ+Er, $Er^{3+}$+VP and $Er^{3+}$+DCQ+VP.

DETAILED DESCRIPTION OF THE INVENTION

The present invention offers methods for synthesizing selective erbium ion imprinted polymer particles having accessible and homogenous imprinted sites for solid phase extraction from dilute aqueous solutions.

As used herein, the term "ion imprinting polymer (IIP)" refers to a material that has been polymerized around an imprint ion in such a way that when imprint ion is removed from the material, cavities or "imprinted sites" remain in the material that are complementary in shape and size of the imprint ion. On the addition of IIP material to dilute solutions containing imprint ion, the imprint sites selectively binds imprint ion. Such binding allows the use of above tailored material for enrichment/separation of imprint ion from other such ions which are similar to it. The salient features of the invention include the following.
i) Synthesis of tailored IIP particles by thermal, photochemical and □-irradiated polymerization.
ii) Pretreatment of the polymer to leach the imprint ion.
iii) Enrichment from dilute aqueous solutions.

i) Synthesis of Tailored Erbium IIP Materials.

Figure 1:
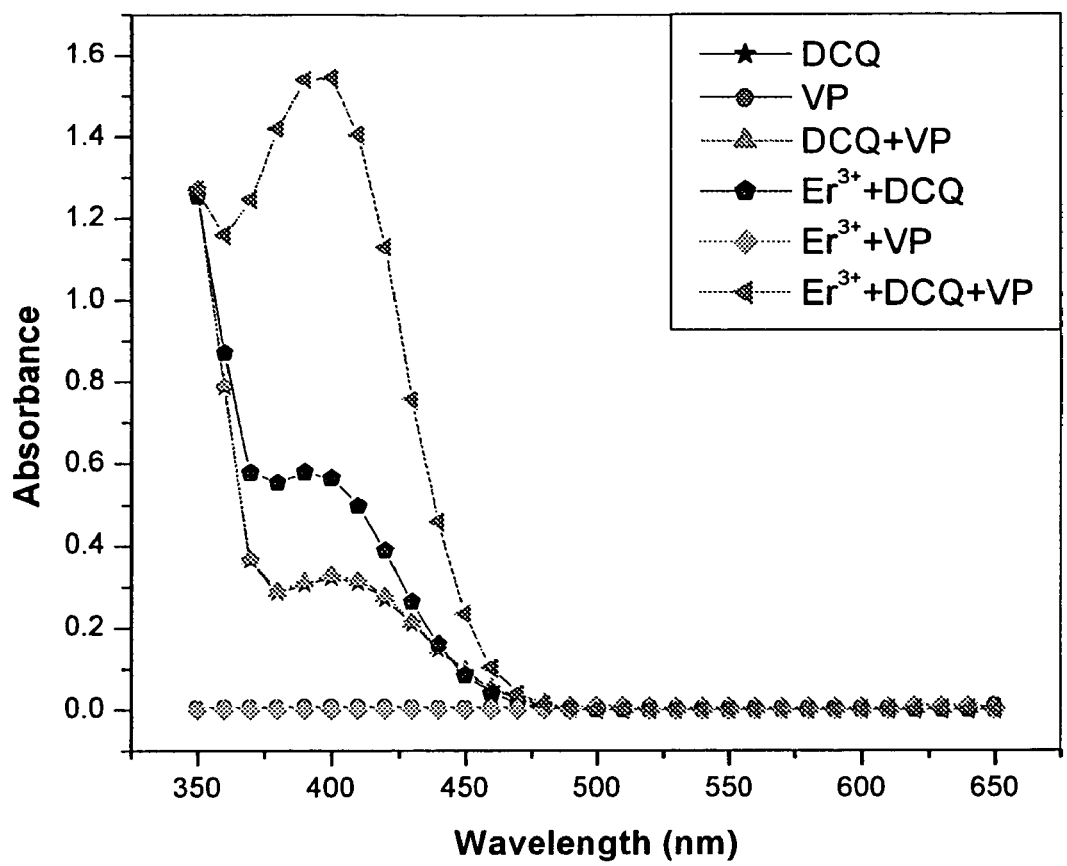
Figure 2:
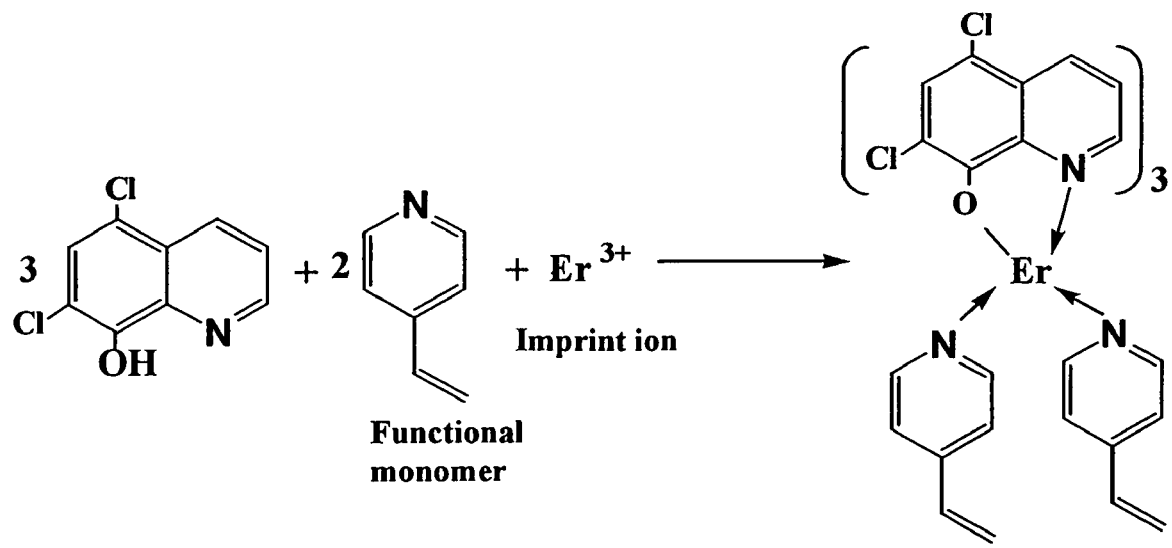
FIG. 2 is a schematic representation of formation of Ternary mixed ligand complex.

There are two main steps in the synthesis of tailored erbium IIP materials (I) formation of ternary mixed ligand complex with imprint ion (Erbium) and (ii) polymerization of ternary mixed ligand complex with MMA and EGDMA. The formation of ternary complex was carried out in 2-methoxy ethanol (porogen). Evidence for complex formation was monitored by recording UV-visible spectra. FIG. 1 shows the absorption spectra of 5,7-dichloroquinoline-8-ol (DCQ), 4-vinyl pyridine (VP), DCQ+VP, $Er^{3+}$+DCQ, $Er^{3+}$+VP and $Er^{3+}$+DCQ+VP. These spectra clearly indicate the formation of ternary complex in 2-methoxy ethanol solution (see FIG. 2).

Figure 3:
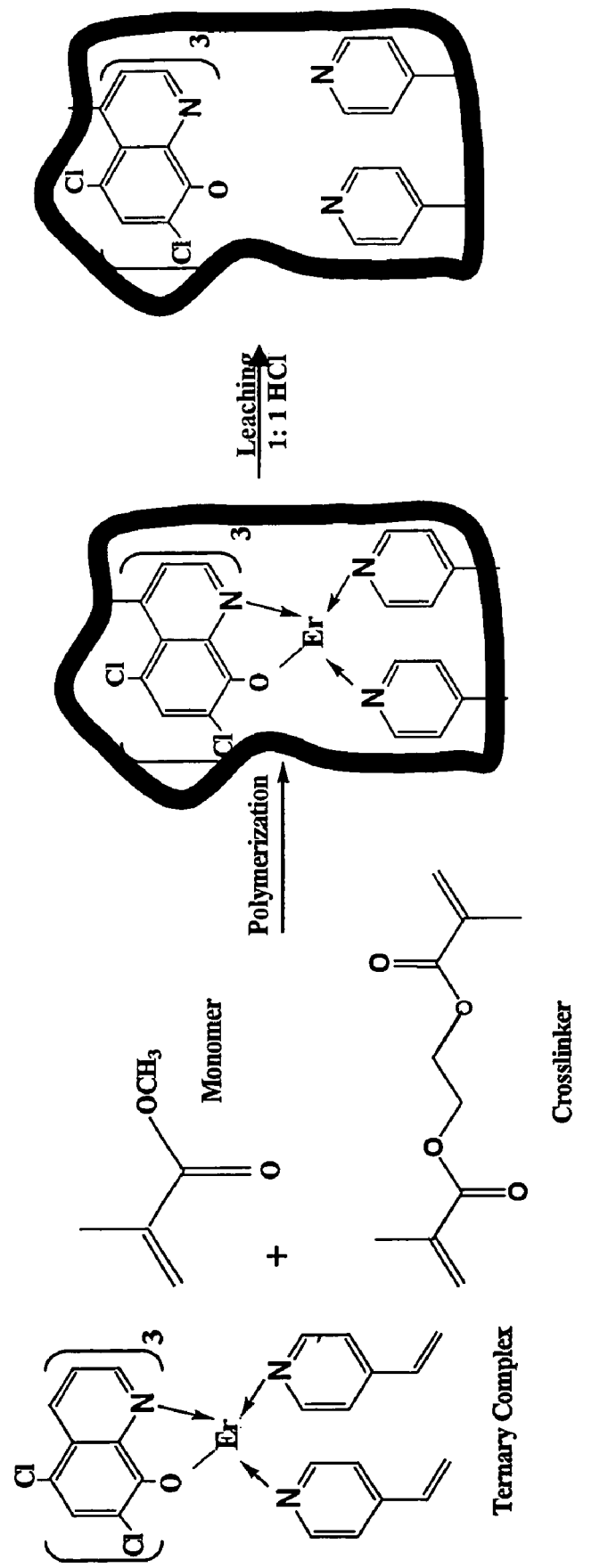
FIG. 3 is a schematic representation of polymer imprinting process.
Figure 4:
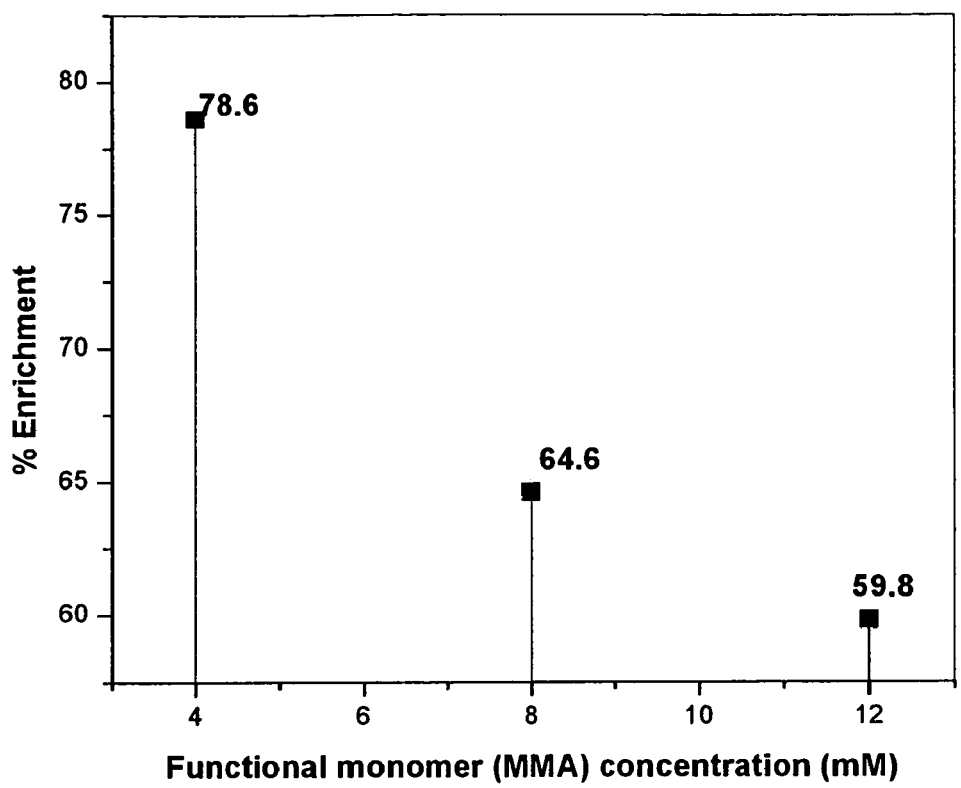
FIG. 4 represents the effect of methyl methacrylate (MMA) (functional monomer) concentration on preconcentration of $Er^{3+}$ using IIP particles synthesized by □-irradiation.
Figure 5:
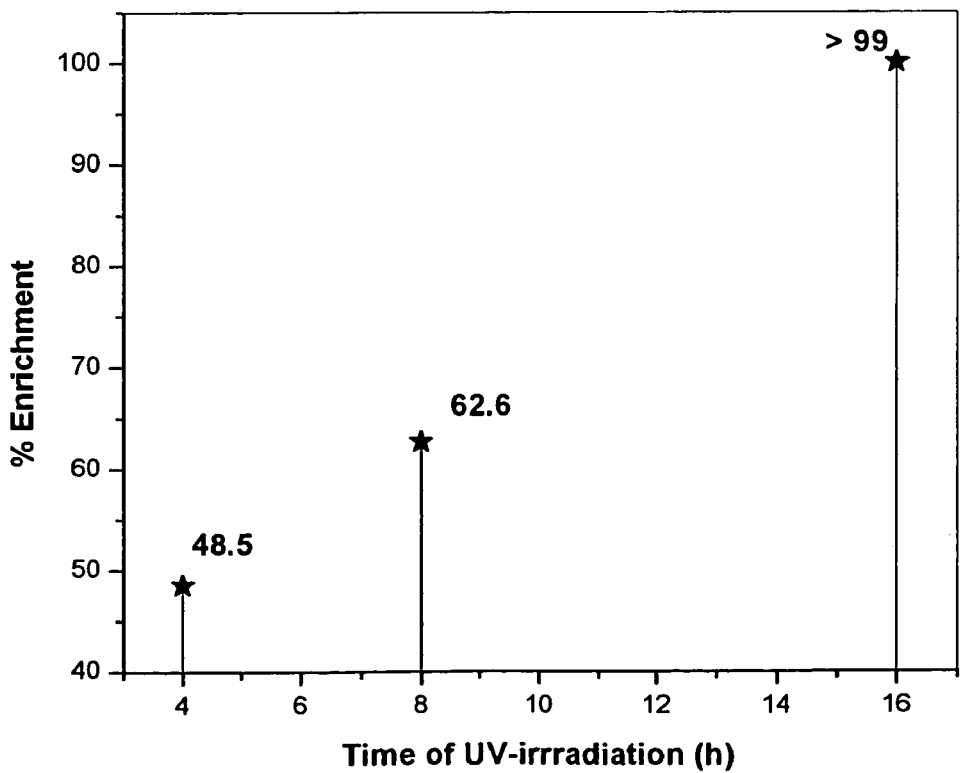
FIG. 5 represents the effect of time of UV-irradiation on preconcentration of $Er^{3+}$ using IIP particles synthesized by photochemical polymerization.
Figure 6:
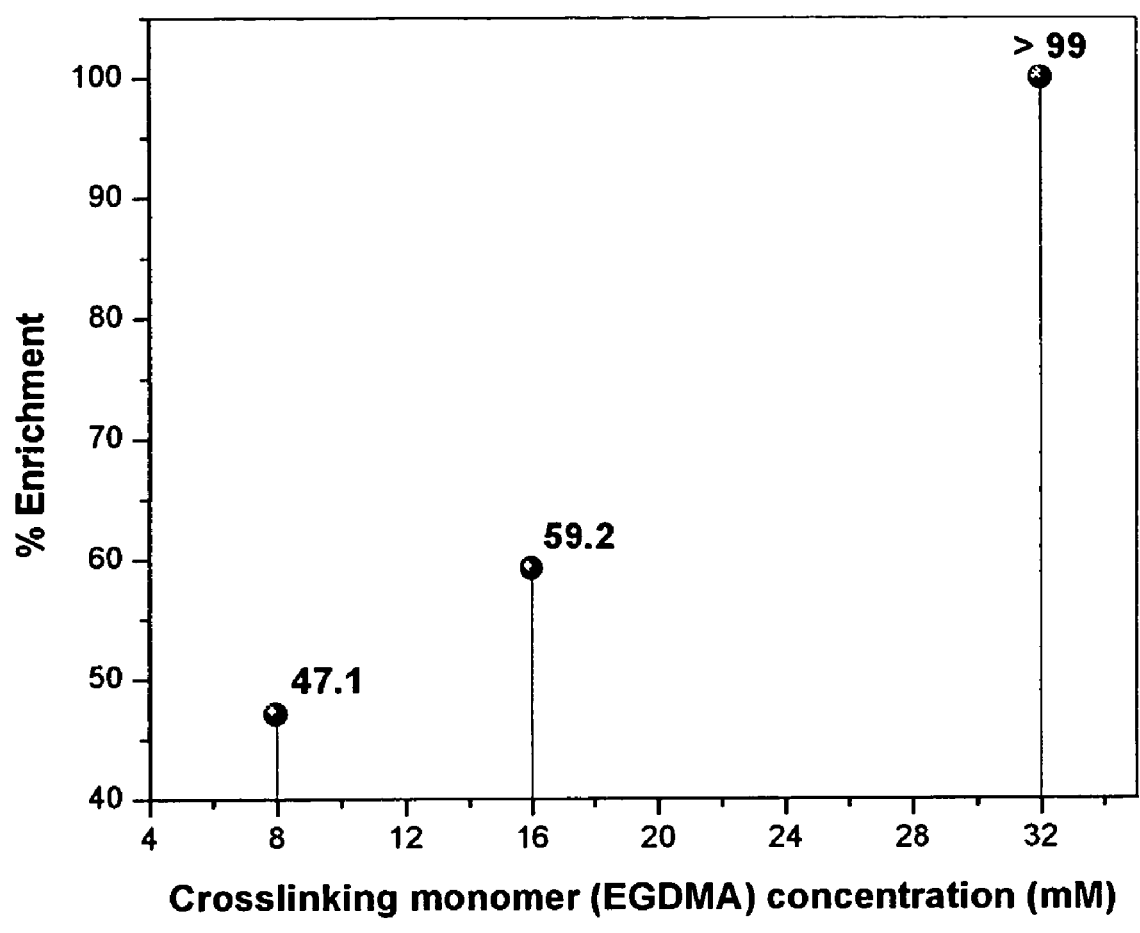
FIG. 6 represents the effect of ethyleneglycoldimethacrylate (EGDMA) (crosslinking monomer) concentration on the preconcentration of $Er^{3+}$ using IIP particles synthesized by thermal polymerization.

The ternary complex was imprinted on addition of functional (MMA) and crosslinking (EGDMA) monomers. In case of thermal and photochemical polymerization only 2,2'-azobisisobutyronitrile is added as polymerization initiator. The resulting IIP materials were dried in an oven at 50° C. to obtain Erbium IIP materials. FIG. 3 shows the schematic representation of polymer imprinted process. These materials were ground and sieved to obtain erbium IIP particles. FIGS. 4, 5 & 6 show the effect of MMA concentration, time of UV irradiation and EGDMA concentration on enrichment of $Er^+$ using IIPs synthesized by □-irradiation, photochemical and thermal polymerization respectively.

ii) Pretreatment of the IIP Materials to Leach the Imprint Ion

The imprint ion, i.e. $Er^{3+}$ was leached from the polymer by stirring with 5N HCl solution for 6 h. The resulting IIP particles were dried in an oven at 50° C. to obtain erbium IIP-SPE particles which can be used for selective enrichment of erbium ions from dilute aqueous solutions.

iii) Enrichment of $Er^{3+}$ from Dilute Aqueous Solutions

The enrichment of erbium ion from dilute aqueous solutions using Erbium IIP particles were studied in detail. FIG. 4 shows the effect of methylmethacrylate (MMA) concentration on the percent enrichment of erbium ion using $Er^{3+}$ IIPs polymerized by γ-irradiation. The effect of time of UV irradiation on the percent enrichment of erbium using IIP particles synthesized by photochemical polymerization is shown in FIG. 5. The influence of crosslinking monomer (EGDMA) concentration during the enrichment of erbium ion is shown in FIG. 6 using IIP particles synthesized by thermal polymerization.

Accordingly, the present invention provides "Synthesis of tailored IIP-SPE particles for uptake of erbium ions and a process thereof" which comprises the following related processes.
(i) Making IIP particles by γ-irradiation, photochemical and thermal polymerization
(ii) Enrichment of erbium ions from dilute aqueous solutions
(iii) Separation of erbium from other lanthanides The following examples illustrate the synthesis of ion imprinted polymer materials for selective solid phase extraction of erbium ions.

EXAMPLE 1

Polymerization by γ-Irradiation 1.0 mM of erbium chloride (0.44 g), 3.0 mM of DCQ (0.64 g) and 2 mM of VP (0.21 g) were taken in 50 ml R.B. flask and solubilized in 5 or 10 ml of 2-methoxy ethanol by stirring. 4 (0.4 g) or 8 (0.8 g) and 12 (1.2 g) mM of MMA and 16 (3.17 g) or 32 (6.34 g) and 48 (9.52 g) mM of EGDMA were added and stirred until a homogeneous solution is obtained. The monomer mixtures were transferred into test tubes, cooled to 0° C., purged with $N_2$ for 10 min and sealed.

These solutions were subjected to γ-irradiation of 1 M rad using $Co^{60}$ source for 4 h. The solid formed was washed with water and dried in an oven at 50° C. This resulted in 5.70, 9.43 and 14.27 g of polymer material with 4, 8 and 12 mM of functional monomer respectively. The polymer embeded erbium ion was leached with 50% (v/v) HCl while stirring for 6 h. This resulted in 4.14, 7.52 and 11.29 g of polymer material with 4, 8 and 12 mM of functional monomer respectively after drying in an oven at 50° C.

EXAMPLE 2

Polymerization by Photochemical Means 1.0 mM of erbium chloride (0.44 g), 3.0 mM of DCQ (0.64 g) and 2.0 mM of VP (0.21 g) were taken in 50 ml R.B. flask and solubilized in 10 ml of 2-methoxyethanol by stirring. 8 mM of MMA (0.8 g), 32 mM of EGDMA (6.35 g) and 50 mg of AIBN were added and stirred until a homogenous solution is obtained. The monomer mixtures are then transferred into test tubes, cooled to 0° C., purged with $N_2$ for 10 min and sealed. These solutions were polymerized by subjecting to UV irradiation (300 nm) for 4, 8 and 16 h. The solid formed was washed with water and dried in an oven at 50° C. This resulted in 7.55, 9.85 and 9.95 g of polymer material with 4, 8 and 16 h of UV irradiation (300 nm). The polymer embeded erbium ion was leached 50% (v/v) HCl while stirring for 6 h. This resulted in 5.35, 7.31 and 7.36 g of polymer material with 4, 8 and 16 h of UV irradiation respectively after drying in an oven at 50° C.

EXAMPLE 3

Polymerization by Thermal Means 1.0 mM of erbium chloride (0.44 g), 3.0 mM of DCQ (0.64 g) and 2.0 mM of VP (0.21 g) were taken in 50 ml R.B. flask and solubilized in 10 ml of 2-methoxyethanol by stirring. 8.0 mM of MMA (0.8 g); and 8, 16 and 32 mM EGDMA (1.59, 3.17 and 6.34 g) and 50 mg of AIBN were added and stirred until a homogenous solution is obtained. The polymerization mixtures were cooled to 0° C., purged with $N_2$ for 10 min, sealed and heated in an oil bath at ~80° C. with stirring for 2 h. The solid formed was washed with water and dried in an oven at 50° C. This resulted in 4.32, 5.50 and 8.84 g of polymer material with 50, 66 and 80% of crosslinking monomer. The polymer embeded erbium ion was leached with 100 ml of 50% (v/v) HCl while stirring for 6 h, filtered and dried in an oven at 50° C. This resulted in 2.59, 3.90 and 7.90 g of erbium ion imprinted polymer materials.

ADVANTAGES OF THE PRESENT INVENTION

Liquid—Liquid extraction process is replacing conventional ion exchange processes as the former one is rapid reliable and easy to scale up. How ever, liquid—liquid extraction processes requires 40–50 stages of counter current extraction as the separation factors for Er with respect to Y is closer to 1.0. Moreover, the use of large volumes of toxic chemicals viz. solvents & extractants are mandatory. On the other hand, the separations based on join imprinted polymer particles described in the present invention are environmentally friendlier, involves reduced costs due to lower consumption of chemicals and offer better selectivity coefficients for Er over Y, Dy, Gd, Th etc.

REFERENCES

Patent Documents
WO9807671 Mark et al
Separating enatiomers by molecular imprinting
U.S. Pat. No. 6,3165,235 Mosbach et al
preparation and use of magnetically susceptible polymer particles
U.S. Pat. No. 5,786,428 Arnold et al
Adsorbents for amino acids and peptide separation
U.S. Pat. No. 5,461,175 Fischer et al
Method for separating enantiomers of aryloxipropanolamine derivatives and chiral solid phase chromatography material for use in the method
U.S. Pat. No. 6,063,637 Arnold et al
Sensors for sugars and other metal binding analytes
U.S. Pat. No. 5,587,273 Yan et al
Molecularly imprinted materials, method for their preparation and devices employing such materials
U.S. Pat. No. 6,310,110 Markowitz et al
Molecularly imprinted material made by template directed synthesis
U.S. Pat. No. 6,057,377 Sasaki et al
Molecular receptors in metal oxide sol-gel materials
U.S. Pat. No. 6,255,461 Mosbach et al
Artificial antibodies to corticosteroids prepared by molecular imprinting
U.S. 2003 049870 Magnus et al
Selective affinity material, preparation there of by molecular imprinting, and use of the same.
U.S. 2003 113234 Murray
Polymer based permeable membrane for removal of ions
U.S. 2003 059 346 Murray
Method and apparatus for environmental phosphate/nitrate pollution removal using a selectively permeable molecularly imprinted polymer membrane
U.S. Pat. No. 6,248,842 Singh et al
Synthetic polymer matrices including pre-organised chelation sites for the selective and reversible binding of metals.
WO99 15, 707 John et al
Detection and extraction of an ion in a solution, particularly uranium ion.
U.S. Pat. No. 6,251,280 Dai et al
Imprint coating synthesis of selective functionalized ordered mesoporous sorbents for separation and sensors Non-Patent References
Garcia et al, Tetrahedron., Lett., 39 (1998) 8651.
Ionic imprinting effect in gadolinium/lanthanum separation
Vigneau et al, Anal. Chim. Acta, 435 (2001) 75.
Ionic imprinted resins based on EDTA and DTPA derivatives for lanthanides (III) separation
Vigneau et al, Chem. Lett. (2002) 202.
Solid-Liquid separation of lanthanide/lanthanide and lanthanide/actinide using ionic imprinted polymer based on a DTPA derivative
Biju et al, Anal. Chim. Acta, 478 (2003) 43.
Ion imprinted polymer: particles synthesis. Characterization and dysprosium ion uptake properties suitable for analytical applications.
Biju et al, Talanta, 60 (2003) 747.
Effect of γ-irradiation of ion imprinted polymer (IIP) particles for preconcentrative separation of dysprosium from other selected lanthanides.

We claim:
1. A process for the synthesis of ion imprinted polymer particles for solid phase extraction preconcentration of erbium ions, the process consisting essentially of:
 (a) forming a mixed ligand ternary complex of erbium imprint ion with 5,7-dichloroquinoline-8-ol and 4-vinyl pyridine;
 (b) dissolving the ternary complex in a suitable porogen to form a pre-polymerizing mixture;
 (c) combining the mixture of step (b) with a functional monomer and a crosslinking monomer and polymerizing by γ-irradiation or by photochemical and thermal polymerization to obtain a polymer material;
 (d) grinding and sieving of polymer material obtained in (c) to prepare erbium ion imprinted polymer particles;
 (e) selective leaching of imprint ion embedded materials in the polymer particles of (d) using a mineral acid.
2. The process as claimed in claim 1 wherein the γ-irradiation is carried out as a function of methyl methacrylate (functional monomer) concentration.
3. The process as claimed in claim 1 wherein the photochemical polymerization is carried out as a function of time of UV irradiation.
4. The process as claimed in claim 1 wherein the thermal polymerization is carried out as a function of ethyleneglycoldimethacrylate (crosslinking monomer) concentration.
5. The process as claimed in claim 1 wherein the functional monomer is selected from the group consisting of 4-vinylpyridine and methylmethacrylate.
6. The process as claimed in claim 1 wherein the crosslinking monomer comprises ethylene glycol dimethacrylate.
7. The process as claimed in claim 1 wherein the reaction is carried out using 2,2'-azobisisobutyronitrile is used as initiator in step (c).
8. The process as claimed in claim 1 wherein the grinding and sieving in step (d) is carried out after drying of the erbium ion imprinted polymer materials.
9. The process as claimed in claim 1 wherein the mineral acid used for leaching comprises HCl.

10. The process of claim 1, wherein the ion imprinted polymer particles are used for separation of erbium ion from dilute aqueous solution, said process further comprising:
  adding the polymer particles to a dilute aqueous solution containing erbium ion; and
  allowing the erbium ion within the dilute aqueous solution to selectively bind the polymer particles for separation of erbium ion from solution.

* * * * *